(12) United States Patent
Lee et al.

(10) Patent No.: US 7,799,401 B2
(45) Date of Patent: Sep. 21, 2010

(54) ADHESIVE SHEET AND MANUFACTURING METHOD THEREOF

(75) Inventors: Dong-Kon Lee, Ulsan (KR); Mi-Ok Lyu, Ulsan (KR); Dong-Hoon Lim, Gwangmyeong-si (KR)

(73) Assignee: LG Chem, Ltd. (KR)

( * ) Notice: Subject to any disclaimer, the term of this patent is extended or adjusted under 35 U.S.C. 154(b) by 25 days.

(21) Appl. No.: 11/574,427

(22) PCT Filed: Jul. 10, 2006

(86) PCT No.: PCT/KR2006/002692

§ 371 (c)(1),
(2), (4) Date: Feb. 28, 2007

(87) PCT Pub. No.: WO2007/035027

PCT Pub. Date: Mar. 29, 2007

(65) Prior Publication Data

US 2009/0041970 A1    Feb. 12, 2009

(30) Foreign Application Priority Data

Sep. 23, 2005    (KR) ...................... 10-2005-0088557

(51) Int. Cl.
  *B32B 9/00* (2006.01)
  *B32B 33/00* (2006.01)
  *B32B 5/16* (2006.01)
(52) U.S. Cl. .................... 428/40.1; 428/40.2; 428/40.9; 428/323; 428/328; 428/402
(58) Field of Classification Search ............... 428/40.1, 428/40.2, 40.9, 323, 328, 402; 524/409, 524/436, 437
See application file for complete search history.

(56) References Cited

U.S. PATENT DOCUMENTS

| | | | | | |
|---|---|---|---|---|---|
| 3,150,032 | A | * | 9/1964 | Rubenstein | ............... 428/313.7 |
| 2004/0018792 | A1 | | 1/2004 | Kaizuka | |
| 2006/0014874 | A1 | | 1/2006 | Ito et al. | |

FOREIGN PATENT DOCUMENTS

| | | | |
|---|---|---|---|
| JP | 10046479 A | * | 2/1998 |
| JP | 2001271276 | * | 10/2001 |
| KR | 1999007978 | | 2/1999 |
| KR | 200219665 | | 1/2001 |

(Continued)

OTHER PUBLICATIONS

International Search Report with Written Opinion; International Application No. PCT/KR2006/002692; International Filing Date Jul. 10, 2006; Applicant's File Reference X06010; Date of Mailing Oct. 12, 2006; 8 pages.

*Primary Examiner*—Patricia L Nordmeyer
(74) *Attorney, Agent, or Firm*—Cantor Colburn LLP

(57) ABSTRACT

Disclosed herein are an adhesive sheet and a manufacturing method thereof. The adhesive sheet comprises a polyvinyl chloride sheet formed of a polyvinyl chloride sheet comprising polyvinyl chloride, tourmaline and/or kiyoseki, and a flame retardant. The adhesive sheet may further comprise an antibacterial/deodorant layer formed on one side of the polyvinyl chloride sheet. The adhesive sheet has excellent ability to remove volatile organic compounds (VOCs), and excellent flame retardancy and printability.

5 Claims, 1 Drawing Sheet

FOREIGN PATENT DOCUMENTS

| | | | |
|---|---|---|---|
| KR | 2001-0111382 A1 | 12/2001 |
| KR | 20040002052 A1 | 1/2004 |
| KR | 20040066538 A1 | 7/2004 |
| KR | 20050076542 A1 | 7/2005 |
| WO | 2004041930 A1 | 5/2004 |

* cited by examiner

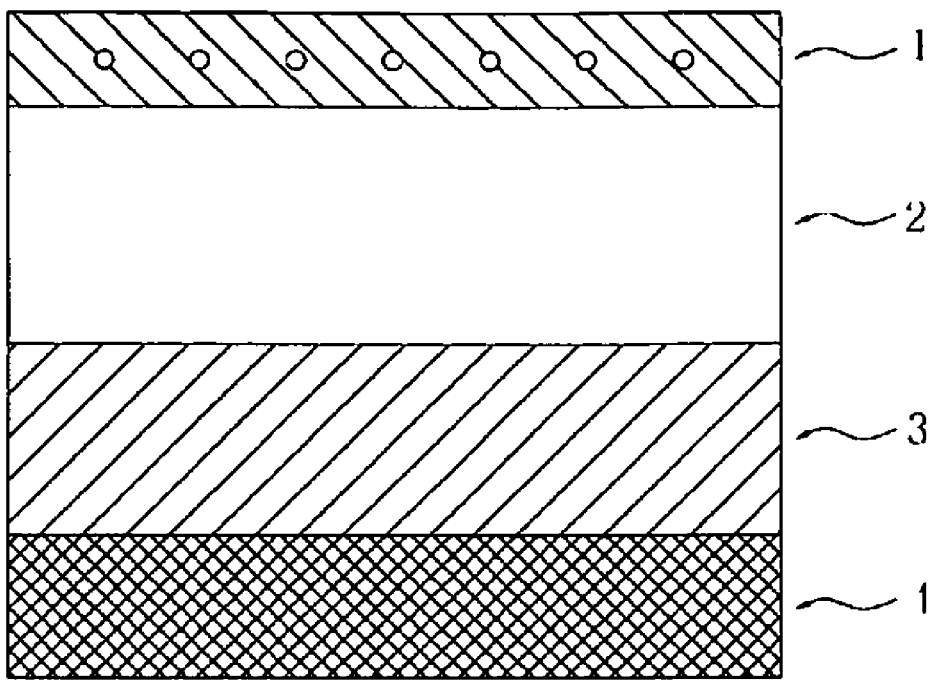

ADHESIVE SHEET AND MANUFACTURING METHOD THEREOF

This application claims the benefit of the filing date of Korean Patent Application No. 10-2005-0088557, filed on Sep. 23, 2005, in the Korean Intellectual Property Office, the disclosure of which is incorporated herein in its entirety by reference.

TECHNICAL FIELD

The present invention relates to an adhesive sheet and a manufacturing method thereof, and more particularly to a polyvinyl chloride sheet containing polyvinyl chloride, and tourmaline and/or kiyoseki, and a flame retardant, as well as a manufacturing method thereof.

The adhesive sheet according to the present invention may further comprise an antibacterial/deodorant layer formed on one side of the polyvinyl chloride sheet.

The adhesive sheet according to the present invention is excellent with respect to the performance of removal of volatile organic compounds and flame retardancy and printability.

BACKGROUND ART

Generally, a printed sheet, which is used as an interior material or for outdoor advertising, is mainly composed of semi-hard polyvinyl chloride sheets attached to both sides of a polyester woven fabric using an adhesive. This printed sheet, when used for outdoor advertising, is placed outside buildings, and thus has no great problem with respect to the generation of volatile organic compounds, air pollution, or flame-resistant or flame-retardant properties. However, when the printed sheet is used indoors, it will emit volatile organic compounds into indoor air, thus causing a problem of indoor air pollution, and the flame-resistant or flame-retardant properties thereof will be problematic.

In an attempt to solve these problems, Korean Utility Model Registration No. 219665 discloses technology relating to a polyvinyl chloride sheet formed of a composition comprising polyvinyl chloride, natural mineral tourmaline, salt, charcoal, a plasticizer and a stabilizer. However, in the polyvinyl chloride sheet, tourmaline is used alone as a natural mineral, and thus it must be used in excess in order to control the emission of volatile organic compounds (VOCs) to the desired level and to prevent air pollution. For this reason, the polyvinyl chloride sheet still has problems of insufficient printability and insufficient flame-resistant or flame-retardant properties, and fails to address the risk of organic solvents, which are frequently used in a printed sheet.

Also, Korean Utility Model Application No. 2004-002052 discloses a functional decorative sheet in which a sheet-type film is coated with nano-particles to increase VOC removal and antibacterial/deodorant activities. However, this decorative sheet is disadvantageous in that it has insufficient flame retardancy and fails to address the risk of organic solvents.

Also, Korean Utility Model Application No. 1998-021810 discloses technology relating to a functional synthetic resin sheet in which a flame-retardant material having fire resistance is added to a base substrate made of cloth. However, there is no mention of an antibacterial/deodorant function.

DISCLOSURE OF THE INVENTION

The present invention has been made to solve the above-described problems occurring in the prior art, and it is an object of the present invention to provide an adhesive sheet which has excellent ability to remove volatile organic compounds (VOC), and excellent flame retardancy and printability, as well as a manufacturing method thereof.

The above object of the present invention can be accomplished by providing an adhesive sheet comprising a polyvinyl chloride sheet (or film), which comprises natural minerals tourmaline and/or kiyoseki, and a flame retardant.

Another object of the present invention is to provide an adhesive sheet which has excellent ability to remove volatile organic compounds (VOCs), and excellent flame retardancy, printability and antibacterial/deodorant properties, as well as a manufacturing method thereof.

TECHNICAL SOLUTION

To achieve the above objects, the present invention provides an adhesive sheet comprising a polyvinyl chloride (PVC) sheet which comprises polyvinyl chloride (PVC), and tourmaline and/or kiyoseki, and a flame retardant.

The PVC sheet according to the present invention is formed of a PVC composition comprising polyvinyl chloride, and tourmaline and/or kiyoseki, and a flame retardant.

Furthermore, the adhesive sheet according to the present invention may further comprise an antibacterial/deodorant layer formed on one side of the PVC sheet.

ADVANTAGEOUS EFFECTS

The adhesive sheet according to the present invention has excellent ability to remove volatile organic compounds (VOC), and excellent printability, flame retardancy and antibacterial/deodorant activities.

DESCRIPTION OF THE DRAWINGS

FIG. 1 is a cross-sectional view of an adhesive sheet according to the present invention.

DESCRIPTION OF REFERENCE NUMERALS USED IN THE DRAWING

1: antibacterial/deodorant layer; 2: PVC sheet; 3: adhesive layer; and 4: release paper.

BEST MODE

The adhesive sheet according to the present invention is mainly useful as a printed sheet for advertisements or as a material for indoor use. For use in such applications, the adhesive sheet should have excellent printability so as to be suitable even for digital printing, should be capable of reducing the generation of volatile organic compounds (VOCs) when printed or used, and must have excellent flame-resistant or flame-retardant properties.

For this reason, the adhesive sheet according to the present invention is formed of a composition comprising: as a base material, polyvinyl chloride, having excellent printability, processability and formability; at least one selected from among tourmaline and kiyoseki, which emit a large amount of anions and far infrared rays while having an excellent ability to remove volatile organic compounds (VOC); and a flame retardant.

Said tourmaline, which is used in the inventive composition, has unique permanent electrical properties among the minerals present on the earth. For this reason, it is called "polar crystal". This mineral emits anions, weak electric current and far infrared light. It is a complex borosilicate of aluminum containing iron, magnesium, alkali metals, and the like, and has polygonal shapes such as particulate, aggregate and vertically striated prismatic shapes. Also, said tourmaline presents no distinct cleavage, can be used with friction to generate electricity, and, when warmed, becomes positively charged at one end and negatively charged at the other end, and was therefore thus named.

Also, said kiyoseki is a natural mineral present on the earth, which emits a large amount of anions and far-infrared rays. It exists in mining fields formed by the action of high temperature and heating water as a result of crustal movements more than about 65,000,000 years ago. Also, it is a natural material that is beneficial for the human body, generates anions in an amount about ten times higher than that of tourmaline, has a high infrared emission rate of 96% and a good surface-active effect, and contain no radioactive elements.

Said tourmaline and kiyoseki emit anions and far infrared rays. Due to the emission of anions, these minerals have excellent effects of enhancing the human body's immune function, removing active oxygen from the human body, improving blood circulation in the human body, purifying the blood in the human body, purifying air for the removal of VOCs. Due to the emission of far infrared rays, these minerals have excellent effects of adult disease prevention, antibacterial activity, heavy metal removal, deodorization, the prevention of mold propagation, and air purification for the removal of VOCs.

The PVC composition for forming the adhesive sheet according to the present invention preferably comprises 2.0-30 parts by weight, based on 100 parts by weight of polyvinyl chloride, of tourmaline and/or kiyoseki.

The polyvinyl chloride preferably has a degree of polymerization of 1000±50, and said tourmaline and/or kiyoseki is preferably in the form of fine powder.

The flame retardant which can be used in the present invention serves to prevent fires caused by volatile organic compounds (VOCs) which are generated mainly in image printing. It may, for example, be at least one selected from among antimony oxide ($Sb_2O_3$), aluminum hydroxide ($Al(OH)_3$) and magnesium hydroxide ($Mg(OH)_2$), and is preferably used in an amount of 5.0-50 parts by weight based on 100 parts by weight of polyvinyl chloride. If it is used in an amount of less than 5.0 parts by weight, it will provide insufficient flame retardancy, and if it is used in an amount exceeding 50 parts by weight, it will cause a processing problem in that the melt viscosity of the resin is reduced.

Polyvinyl chloride, which is used as a base resin in the present invention, has problems in that it is generally easily discolored or degraded by heat and oxygen, is difficult to process at high temperatures for a long period of time, and also has low light resistance. To overcome the problems with polyvinyl chloride, it is preferable to use an antioxidant in the inventive composition. The use of the antioxidant can improve the stability of the PVC in a calendering process for forming the sheet. Examples of the antioxidant, which can be used in the present invention, include amine, phenol and phosphite antioxidants, and it is preferably used in an amount of 0.1-1.0 parts by weight based on 100 parts by weight of polyvinyl chloride. If the antioxidant is used in an amount of 0.1 parts by weight, yellowing and roll adhesion of the PVC resin composition will occur in a calendering process due to the oxidation and decomposition thereof, and if it is used in an amount exceeding 0.1 part by weight, the calendering processability of the PVC resin composition can be reduced.

Also, the PVC resin composition for forming the adhesive sheet according to the present invention preferably contains a lubricant to improve the processability thereof. Examples of lubricant that can be used in the present invention include montan wax, esterified montan wax, olefin wax and amide wax. The lubricant is preferably used in an amount of 1.0-2.0 parts by weight based on 100 parts by weight of polyvinyl chloride. If the lubricant is used in an amount less than 1.0 part by weight, roll adhesion can occur in a calendering process, and if it is used in an amount exceeding 2.0 parts by weight, the printability of the sheet product can be reduced in the use thereof.

The PVC composition according to the present invention may contain a pigment for tinting and hiding in the printing of the sheet. Examples of pigment that can be used in the present invention include inorganic pigments such as titanium oxide, and the pigment is preferably used in an amount of 4.0-30 parts by weight based on 100 parts by weight of polyvinyl chloride. If the pigment is used in an amount of less than 4.0 parts by weight, it will have low hiding power, and if it is used in amount exceeding 30 parts by weight, it can cause a processing problem in that the melt viscosity of the resin is reduced.

The adhesive sheet according to the present invention can be manufactured from the PVC composition using a conventional sheet (film) formation process such as a calendering, casting or extrusion molding process. The method for manufacturing the adhesive sheet according to the present invention comprises the steps of: preparing the polyvinyl chloride composition; and a forming a polyvinyl chloride sheet from said polyvinyl chloride composition.

The process of mixing the PVC composition according to the present invention is preferably performed by gelling the composition in a Banbury mixer. If the mixing process is performed by gelling through an extruder, it is preferable to use a compound containing said composition.

The adhesive sheet according to the present invention may further comprise an antibacterial/deodorant layer formed on one side of the polyvinyl chloride sheet. The antibacterial/deodorant layer contains at least one metal powder selected from the group consisting of gold, silver, and gold nano-particles, and constitutes the surface layer of the adhesive sheet. The antibacterial/deodorant layer can be formed by coating said metal nano-particles on the sheet, has bactericidal/deodorant functions, and can reduce the emission of volatile organic compounds. In addition, because it is a metal nano-particle layer, it has a smooth surface, and thus can improve the printability of the sheet.

The antibacterial/deodorant layer can be formed by applying the metal nano-particles on one side of the polyvinyl chloride sheet according to a conventional chemical vapor deposition process, a coating process (gravure coating, spray coating, dip coating or screen coating), or a laminating process.

Referring to FIG. 1, the inventive adhesive sheet having the antibacterial/deodorant layer formed thereon consists of a stacked structure in which an antibacterial/deodorant layer 1 as a surface layer, a polyvinyl chloride sheet 2, an adhesive layer 3, and a release paper layer 4 are formed sequentially downward from the antibacterial/deodorant layer 1.

The inventive sheet preferably has a thickness in the range of 0.1-1.0 mm for the use thereof.

MODE FOR INVENTION

Hereinafter, the adhesive sheet according to the present invention and the manufacturing method thereof will be described in further detail with reference to examples.

Example 1

As a composition for forming an adhesive sheet, a polyvinyl chloride composition was first obtained by mixing 100 parts by weight of polyvinyl chloride (LS-100, LG, Korea), 8 parts by weight of tourmaline powder, 0.8 parts by weight of montan wax (WE-40, Clariant, USA) as a lubricant, 0.5 parts by weight of a phosphite antioxidant (Irganox B-561, Ciba AG, Switzerland), 21 parts by weight of antimony oxide as a flame retardant, and 6.0 parts by weight of titanium oxide (CR-834, Kerr McGee Chemical Corp., Australia).

The composition was sufficiently gelled in a banbury mixer and passed through calender rolls to manufacture a polyvinyl chloride sheet having a thickness of 0.10-0.15 mm. Then, silver nano-particles were applied to one side of the polyvinyl chloride sheet according to a coating process, thereby manufacturing an adhesive sheet.

The adhesive sheet manufactured in this Example was measured for flame retardancy and the emission of anions and far infrared rays, the results of which are shown in Table 1 below. Also, the sheet was measured for deodorization and VOC reduction, the results of which are shown in Table 2 below.

Example 2

An adhesive sheet was manufactured in the same manner as in Example 1, except that 8 parts by weight of kiyoseki powder was used in place of 8 parts by weight of tourmaline powder. Then, the adhesive sheet was measured for flame retardancy and the emission of anions and far infrared rays, the results of which are shown in Table 1 below. Also, the sheet was measured for deodorization and VOC reduction, the results of which are shown in Table 2 below.

Example 3

An adhesive sheet was manufactured in the same manner as in Example 1, except that 4 parts by weight of tourmaline powder and 4 parts by weight of kiyoseki powder were used in place of 8 parts by weight of tourmaline powder. Then, the sheet was measured for flame retardancy and the emission of anions and far infrared rays, the results of which are shown in Table 1 below. Also, the sheet was measured for deodorization and VOC reduction, the results of which are shown in Table 2 below.

Example 4

An adhesive sheet was manufactured in the same manner as in Example 1, except that the polyvinyl chloride sheet was not coated with silver nano-particles. Then, the sheet was measured for flame retardancy and the emission of anions and far infrared rays, the results of which are shown in Table 1 below. Also, the sheet was measured for deodorization and VOC reduction, the results of which are shown in Table 2 below.

Comparative Example 1

An adhesive sheet was manufactured in the same manner as in Example 1, except that tourmaline powder and/or kiyoseki powder was not used. Then, the sheet was measured for flame retardancy and the emission of anions and far infrared rays, the results of which are shown in Table 1 below. Also, the sheet was measured for deodorization and VOC reduction, the results of which are shown in Table 2 below.

Comparative Example 2

An adhesive sheet was manufactured in the same manner as in Example 1, except that the flame retardant was not used. Then, the sheet was measured for flame retardancy and the emission of anions and far infrared rays, the results of which are shown in Table 1 below. Also, the sheet was measured for deodorization and VOC reduction, the results of which are shown in Table 2 below.

TABLE 1

| Measurement results for flame resistance, anions and far infrared rays | | | | | | | | | | |
|---|---|---|---|---|---|---|---|---|---|---|
| Item | | Measurement method [1] | | Acceptable Standard | Ex. 1 | Ex. 2 | Ex. 3 | Comp. Ex. 1 | Comp. Ex. 2 | Ex. 4 |
| Flammability | Fuel | KSM2150 (liquefied petroleum gas) No. 4 | Char length | Less than 2 cm | 6.3 | 7.5 | 6.4 | 8.0 | After 10 seconds of heating, one-half of the total area was carbonized, and thus the experiment had to be ended. | 7.3 |
| | Burner | Micro | Char area | Less than 30 cm$^2$ | 25.7 | 26.3 | 24.7 | 26.0 | | 27.2 |
| | Flame length | 45 mm | After-flame time | Shorter than 3 sec | 0 | 0 | 0 | 0 | After 10 seconds of heating, one-half of the total area was carbonized, and thus the experiment had to be ended. | 0 |
| | Heating | 60 sec | After-glow time | Shorter than 5 sec | 0 | 0 | 0 | 0 | | 0 |

TABLE 1-continued

Measurement results for flame resistance, anions and far infrared rays

| Item | Measurement method [1] | | Acceptable Standard | Ex. 1 | Ex. 2 | Ex. 3 | Comp. Ex. 1 | Comp. Ex. 2 | Ex. 4 |
|---|---|---|---|---|---|---|---|---|---|
| | Test sample | (35 cm × 25 cm) | | Same | Same | Same | Same | Same | Same |
| Anions [2] | KICM-FIR-10421 | | 106/1 cc | 900/1 cc | 1100/1 cc | 1000/1 cc | 200/1 cc | 900/1 cc | 700/1 cc |
| Far infrared rays [3] | FT-IR | | 1 | 0.87 | 0.90 | 0.89 | 0.82 | 0.85 | 0.85 |

[1] Flammability was measured on the basis of a 45-degree slope method described in the Enforcement Decree of the Fire Services Act (products below 450 g/m$^2$).
[2] The emission of anions was measured using a charged particle measurement device in conditions of a temperature of 23° C., humidity of 48% and 106 anions/cc of air, and anions emitted from the test samples were measured and recorded as the number of anions per unit volume.
[3] The emission of far infrared rays was measured in comparison with a black body using FT-IR at 37° C. The black body is an ideal body having a value of 1.

As shown in Table 1 above, the adhesive sheets according to Examples 1 to 4 of the present invention showed excellent fire retardancy, because the char area and char length thereof were small compared to Comparative Examples 1 and 2, and the after-flame time and after-glow time thereof were shorter than the acceptable standard.

Also, the adhesive sheets according to Examples 1 to 4 emitted large amounts of anions and far infrared rays compared to Comparative Example 1. This suggests that these adhesive sheets of the present invention are beneficial to the human body.

TABLE 2

Measurement results for deodorization and VOC reduction

| Item | Ex. 1 | Ex. 2 | Ex. 3 | Comp. Ex. 1 | Comp. Ex. 2 | Ex. 4 | Evaluation method |
|---|---|---|---|---|---|---|---|
| Deodorization | More than 50% | More than 50% | More than 50% | 30-50% | Less than 30% | 30-50% | Gas deodorant tube method[1] |
| VOC reduction | More than 50% | More than 50% | More than 50% | Less than 30% | Less than 30% | 30-50% | Gas deodorant tube method[2] |

[1] The gas deodorizing tube method for the measurement of deodorization was carried out to measure the reduction in deodorization by injecting ammonia gas into a 500-ml container, placing a sample having a size of 10 cm × 10 cm in the container, and measuring the concentration of the gas as a function of time.
[2] The gas deodorizing tube method was carried out to measure the reduction in VOCs by injecting toluene gas into a 500-ml container, placing a sample having a size of 10 cm × 10 cm in the container, and measuring the concentration of VOCs as a function of time.

As shown in Table 2 below, the adhesive sheets according to Examples 1 to 4 of the present invention had excellent abilities to deodorize and to reduce VOCs, and thus had excellent workability, compared to Comparative Examples 1 and 2.

INDUSTRIAL APPLICABILITY

As described above, the adhesive sheet according to the present invention comprises a sheet formed of a composition comprising a natural mineral and a flame retardant. Thus, in a printing operation, it shows excellent flame retardancy and an excellent effect on VOC reduction, compared to the prior polyvinyl chloride products. Also, the adhesive sheet according to the present invention emits anions and far infrared rays, and further comprises the metal nano-particle layer formed on one side thereof, and thus has excellent deodorant and antibacterial activities. Also, it has improved printability, because the surface of the metal nano-particle layer is smooth. Also, it does not cause an environmental problem in a place where it is provided. In addition, the adhesive sheet according to the present invention has a simple structure and diverse functions, and thus is advantageous in terms of cost.

The invention claimed is:

1. An adhesive sheet comprising:
    a polyvinyl chloride sheet formed of a polyvinyl chloride composition comprising polyvinyl chloride (PVC), and tourmaline and/or kiyoseki, and a flame retardant;
    an antibacterial/deodorant layer formed on one side of the polyvinyl chloride sheet, the antibacterial/deodorant layer being made of at least one metal powder selected from the group consisting of gold, silver and copper nano-particles; and
    an adhesive layer and release paper layer sequentially formed on the other side of the polyvinyl chloride sheet.

2. The adhesive sheet of claim 1, wherein the polyvinyl chloride composition comprises 2.0-30 parts by weight, based on 100 parts by weight of the polyvinyl chloride, of the tourmaline and/or kiyoseki, and 5.0-50 parts by weight of the flame retardant.

3. The adhesive sheet of claim 1, wherein the polyvinyl chloride composition further comprises a lubricant, an antioxidant, and a pigment.

4. The adhesive sheet of claim 1, wherein the flame retardant is at least one selected from the group consisting of antimony oxide ($Sb_2O_3$), aluminum oxide ($Al(OH)_3$), and magnesium hydroxide ($Mg(OH)_2$).

5. The adhesive sheet of claim 3, wherein the polyvinyl chloride composition comprises 2.0-30 parts by weight, based on 100 parts by weight of the polyvinyl chloride, of the tourmaline and/or kiyoseki, 5.0-50 parts by weight of the flame retardant, 0.1-2.0 parts by weight of the lubricant, 0.1-1.0 part by weight of the antioxidant and 4.0-30 parts by weight of the pigment.

* * * * *